US010621245B2

(12) United States Patent
He

(10) Patent No.: US 10,621,245 B2
(45) Date of Patent: Apr. 14, 2020

(54) WEBPAGE DATA ANALYSIS METHOD AND DEVICE

(71) Applicant: Beijing Gridsum Technology Co., Ltd., Beijing (CN)

(72) Inventor: Xin He, Beijing (CN)

(73) Assignee: Beijing Gridsum Technology Co., Ltd., Beijing (CN)

( * ) Notice: Subject to any disclaimer, the term of this patent is extended or adjusted under 35 U.S.C. 154(b) by 452 days.

(21) Appl. No.: 15/513,501

(22) PCT Filed: Sep. 21, 2015

(86) PCT No.: PCT/CN2015/090185
§ 371 (c)(1),
(2) Date: Mar. 22, 2017

(87) PCT Pub. No.: WO2016/045567
PCT Pub. Date: Mar. 31, 2016

(65) Prior Publication Data
US 2017/0300573 A1 Oct. 19, 2017

(30) Foreign Application Priority Data

Sep. 22, 2014 (CN) .......................... 2014 1 0487202

(51) Int. Cl.
G06F 7/00 (2006.01)
G06F 17/30 (2006.01)
G06F 16/951 (2019.01)
G06F 16/35 (2019.01)

(52) U.S. Cl.
CPC .......... *G06F 16/951* (2019.01); *G06F 16/355* (2019.01)

(58) Field of Classification Search
None
See application file for complete search history.

(56) References Cited

U.S. PATENT DOCUMENTS 8,554,618 B1 * 10/2013 Gasch ................ G06Q 30/0241
705/14.4
2005/0144162 A1 * 6/2005 Liang .................... G06F 16/355
(Continued)

FOREIGN PATENT DOCUMENTS

| CN | 101118560 A | 2/2008 |
| CN | 102929870 A | 2/2013 |

(Continued)

OTHER PUBLICATIONS

International Search Report of PCT Application No. PCT/CN2015/090185, dated Dec. 11, 2015.

*Primary Examiner* — Tuan A Pham
(74) *Attorney, Agent, or Firm* — Pearl Cohen Zedek Latzer Baratz LLP

(57) ABSTRACT

The disclosure provides a method and device for analyzing webpage data. The method for analyzing webpage data includes: acquiring m keywords inputted by a user on a webpage (S102); acquiring keywords in the m keywords with a dependence relationship, wherein the keywords with the dependence relationship are keywords corresponding to one or more same user requirements (S104); and classifying the keywords with the dependence relationship in the m keywords as keywords of a same type (S106).

7 Claims, 8 Drawing Sheets

(56) References Cited

U.S. PATENT DOCUMENTS

| | | | | |
|---|---|---|---|---|
| 2007/0179832 A1* | 8/2007 | Reich | ............... | G06Q 10/06375 |
| | | | | 705/7.29 |
| 2010/0185689 A1* | 7/2010 | Hu | ...................... | G06F 17/2775 |
| | | | | 707/803 |
| 2012/0095837 A1* | 4/2012 | Bharat | ................... | G06Q 30/02 |
| | | | | 705/14.54 |
| 2014/0280185 A1* | 9/2014 | Nordstrom | .......... | G06F 11/0721 |
| | | | | 707/741 |

FOREIGN PATENT DOCUMENTS

| | | | |
|---|---|---|---|
| CN | 103177036 | A | 6/2013 |
| CN | 104199969 | A | 12/2014 |
| JP | 2006215717 | A | 8/2006 |

* cited by examiner

WEBPAGE DATA ANALYSIS METHOD AND DEVICE

CROSS-REFERENCE TO RELATED APPLICATIONS

This application is a National Phase Application of PCT International Application No. PCT/CN2015/090185, International Filing Date Sep. 21, 2015, claiming priority of Chinese Patent Application No. 201410487202.3, filed Sep. 22, 2014, which is hereby incorporated by reference in its entirety.

TECHNICAL FIELD

The embodiments of the disclosure relate to the field of data analysis and, in particularly, to a method and device for analyzing webpage data.

BACKGROUND

Users usually have a certain purpose and intention to browse websites. For the websites, it is important to understand the true intention of visit of the user. The websites usually classify the users visiting the websites through the method of the behavior trajectory construction model of the users browsing the websites for training a classifier, or describe the user requirement by the popularity of queries in the websites.

The intral-website searching manner is the behavior that a user actively seeks information, and can describe the user requirement to a certain extent. The traditional website query clustering technology performs calculation through the literally overlapping between words depending on the Query itself. The implementation scheme is generally as follows: Step 1: keywords are literally dismantled (including word for word or word segmentation), the dismantled keywords can be expressed as a sequence string with a phrase (word) as a unit; Step 2: then the similarity of each pair of keyword pairs (jaccard or edit distance, etc.) is calculated one by one, that is, the degree of overlap of the string of words of two queries is compared, and the metric of similarity is returned; Step 3: it is clustered with a clustering algorithm. The clustering algorithm includes k-means clustering or hierarchical clustering, etc., and the implementing manners of different clustering algorithms are different but are the same in essence. Since the traditional technology is to establish contact through the degree of literal overlap of keywords, which does not meet the actual situation and just rigidly constructs a relevant dependence relationship, the user requirement cannot be accurately explained. For example, there is not any literal match between the Chinese name of Samsung Inc. "三星" and the Chinese name of Apple Inc. "苹果", but the correlation should be high, while the Chinese characters "本田" and "本源" are two types of words completely unrelated, but still have a relevant dependence relationship literally. Moreover, the existing website query clustering technology needs to calculate the similarity between each two keywords, which is high in complexity and does not apply to large-scale data mining.

There is no effective solution for the problem in the related art that the method for analyzing webpage data only relies on the degree of literal overlap of queries so that the data analyzing results cannot accurately explain the user requirement.

SUMMARY

The embodiments of the disclosure have been provided for the problem that the existing method for analyzing webpage data only relies on the degree of literal overlap of queries so that the data analyzing results cannot accurately explain the user requirement. Therefor, the main object of the embodiments of the disclosure is to provide a method and device for analyzing webpage data to solve the above problem.

In order to achieve the above object, according to an aspect of the embodiments of the disclosure, there is provided a method for analyzing webpage data, wherein the method includes: m keywords inputted by a user on the webpage are acquired; keywords with a dependence relationship in the m keywords are acquired, wherein the keywords with the dependence relationship are keywords corresponding to one or more same user requirements; and the keywords with the dependence relationship in the m keywords are classified as keywords of a same type.

In an example embodiment of the disclosure, the step that m keywords inputted by a user on the webpage are acquired includes: a script file code is loaded on the webpage; an input behavior of the user is received on the webpage; and the m keywords carried by the input behavior on the webpage are read through the script file code.

In an example embodiment of the disclosure, the step that keywords with a dependence relationship in the m keywords are acquired includes: a hypothetical condition is determined, wherein the hypothetical condition is a hypothetic logical relationship included in the input behavior of the m keywords; a graph model {G, S} is created according to the hypothetical condition, wherein G represents a set of the m keywords, and S represents a set of dependence relationships between the m keywords; and keywords with the dependence relationship in the m keywords are acquired through the graph model.

In an example embodiment of the disclosure, the step that keywords with the dependence relationship in the m keywords are acquired through the graph model includes: a transition probability is calculated according to intensities of the dependence relationships between the m keywords, wherein the transition probability is a probability that each keyword belongs to a keyword with which the dependence relationship exists; and iteration is performed on the m keywords according to the transition probability to acquire keywords with the dependence relationship in the m keywords.

In an example embodiment of the disclosure, the step that iteration is performed on the m keywords according to the transition probability to acquire keywords with the dependence relationship in the m keywords includes: it is assumed that an i-th keyword belongs to an i-th keyword cluster before the iteration is performed, wherein the cluster is a set of a type of keywords, i=1, 2 . . . m; iteration is performed on the i-th keyword for one time according to the transition probability, to calculate a k-th keyword cluster to which the i-th keyword after the iteration belongs, wherein k∈{1, 2 . . . i−1, i+1 . . . m}; it is determined whether the difference between the i-th cluster and the k-th cluster is less than a preset value, wherein the preset value is a preset error tolerance value of a keyword cluster set; the iteration is continued under a condition that the difference between the i-th cluster and the k-th cluster is greater than the preset value; and the iteration is stopped under a condition that the difference between the i-th cluster and the k-th cluster is less than or equal to the preset value, to acquire all keywords in the keyword cluster to which the i-th keyword belongs.

In an example embodiment of the disclosure, after classifying the keywords with the dependence relationship in the m keywords as keywords of a same type further includes: a plurality of keywords of the same type are named respectively; and the plurality of named keywords of the same type are sequenced according to the number of the keywords included in each type of keywords.

In order to achieve the above object, according to another aspect of the embodiments of the disclosure, there is provided a webpage data analyzing device, wherein the device includes: a first acquiring component arranged to acquire m keywords inputted by a user on the webpage; a second acquiring component arranged to acquire keywords in the m keywords with a dependence relationship, wherein the keywords with the dependence relationship are keywords corresponding to one or more same user requirements; and a classifying component arranged to classify the keywords with the dependence relationship in the m keywords as keywords of a same type.

In an example embodiment of the disclosure, the first acquiring component includes: a loading module arranged to load a script file code on the webpage; a receiving module arranged to receive an input behavior of the user on the webpage; and a reading module arranged to read, through the script file code, the m keywords carried by the input behavior on the webpage.

In an example embodiment of the disclosure, the second acquiring component includes: a first determining module arranged to determine a hypothetical condition, wherein the hypothetical condition is a hypothetic logical relationship included in the input behavior of the m keywords; a creating module arranged to creat a graph model {G, S} according to the hypothetical condition, wherein G represents a set of the m keywords, and S represents a set of dependence relationships between the m keywords; and a first acquiring module arranged to acquire keywords with the dependence relationship in the m keywords through the graph model.

In an example embodiment of the disclosure, the first determining module includes: a calculating module arranged to calculate a transition probability according to intensities of the dependence relationships between the m keywords, wherein the transition probability is a probability that each keyword belongs to a keyword with which the dependence relationship exists; and a second acquiring module arranged to perform iteration on the m keywords according to the transition probability to acquire keywords with the dependence relationship in the m keywords.

In an example embodiment of the disclosure, the second acquiring module includes: an assuming sub-module arranged to assume that an i-th keyword belongs to an i-th keyword cluster before the iteration is performed, wherein the cluster is a set of a type of keywords, i=1, 2 . . . m; a calculating sub-module arranged to perform iteration on the i-th keyword for one time according to the transition probability, to calculate a k-th keyword cluster to which the i-th keyword after the iteration belongs, wherein $k \in \{1, 2 \ldots i-1, i+1 \ldots m\}$; a determining sub-module arranged to determine whether the difference between the i-th cluster and the k-th cluster is less than a preset value, wherein the preset value is a preset error tolerance value of a keyword cluster set; an iterating sub-module arranged to continue the iteration under a condition that the difference between the i-th cluster and the k-th cluster is greater than the preset value; and an acquiring sub-module arranged to stop the iteration under a condition that the difference between the i-th cluster and the k-th cluster is less than or equal to the preset value, to acquire all keywords in the keyword cluster to which the i-th keyword belongs.

In an example embodiment of the disclosure, the device further includes: a naming component arranged to name a plurality of keywords of the same type, respectively; and a sequencing component arranged to sequence, according to the number of the keywords included in each type of keywords, the plurality of named keywords of the same type.

According to the embodiments of the disclosure, there is adopted a method including the following steps: m keywords inputted by a user on the webpage are acquired; keywords with a dependence relationship in the m keywords are acquired, the keywords with the dependence relationship are keywords corresponding to one or more same user requirements; and the keywords with the dependence relationship in the m keywords are classified as keywords of a same type, so as to solve the problem that the existing method for analyzing webpage data only relies on the degree of literal overlap of queries so that the data analyzing results cannot accurately explain the user requirement. The webpage data is classified by using the dependence relationship between the keywords determined by the user requirement so as to accurately reflect the user requirement by classification results.

BRIEF DESCRIPTION OF THE DRAWINGS

The drawings forming a part of the embodiments of the disclosure are described here to provide further understanding of the embodiments of the disclosure. The schematic embodiments and description of the embodiments of the disclosure are adopted to explain the embodiments of the disclosure, and do not form improper limits to the embodiments of the disclosure. In the drawings.

DETAILED DESCRIPTION OF THE EMBODIMENTS

It is important to note that the embodiments of the disclosure and the characteristics in the embodiments may be combined with each other under the condition of no conflicts. The embodiments of the disclosure are described below with reference to the drawings and the embodiments in detail.

Figure 1:
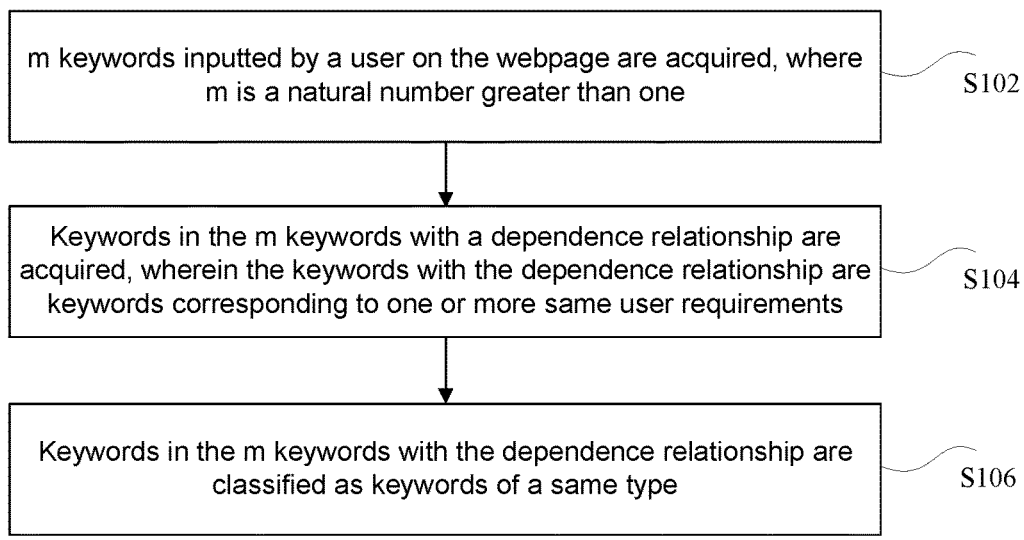
FIG. 1 is a flow diagram of a first embodiment of a data analyzing method according to the disclosure.

FIG. 1 is a flow diagram of a first embodiment of a method for analyzing webpage data according to the disclosure. As shown in FIG. 1, the method includes the following steps.

Step S102: m keywords inputted by a user on the webpage are acquired, where m is a natural number greater than one.

There are many-to-many dependence relationships between the user requirements and the keywords inputted by the user, that is, each user requirement can represent the intention by the different keywords inputted by the user, and each keyword can also represent the intention of multiple different user requirements. In order to simplify the problem, the method defines a one-to-many dependence relationship between the user requirements and the keywords inputted by the user. User requirements can be identified by clustering the keywords inputted by the user in the website.

Step S104: Keywords in the m keywords with a dependence relationship are acquired, wherein the keywords with the dependence relationship are keywords corresponding to one or more same user requirements.

For a webpage data search behavior of the user, a relationship exists between the various searched keywords. This relationship is not the literal similarity of each keyword, but the user requirements reflected by the keywords are the same. For example, when a user searches for a webpage, there may be the following dependence relationship between the keywords that are searched: a keyword is the attribution of the previous keyword ($k_i=f(k_{i-1})$), or the latter keyword is the attribution of all the previous keywords ($K_i=f(k_{i-1}, k_{i-2}, k_{i-3}, \ldots, k_1)$), and so on.

Step S106: Keywords in the m keywords with the dependence relationship are classified as keywords of a same type.

Because a type of keywords with dependence relationship correspond to one or more same user requirements, the keywords inputted by the user can be divided into several types according to the dependence relationship. Through this clustering manner, the deep keyword aggregation relationship can be excavated, so as to accurately represent the user requirement.

For example, the relationship between the Chinese characters "违章", "电子眼", "电子 jin" and "电子敬察" can be found.

This embodiment does not unilaterally depend on the degree of overlap between keywords since the following steps are taken: acquiring m keywords inputted by a user on the webpage; acquiring keywords in the m keywords with a dependence relationship; and classifying the keywords with the dependence relationship in the m keywords as keywords of a same type. This method breaks through the limitations of the traditional query aggregation process based on the assumption that the query itself matches literally, and uses the user behavior data to carry out data mining to construct a mathematical model which is more in line with the user requirement.

Figure 2:
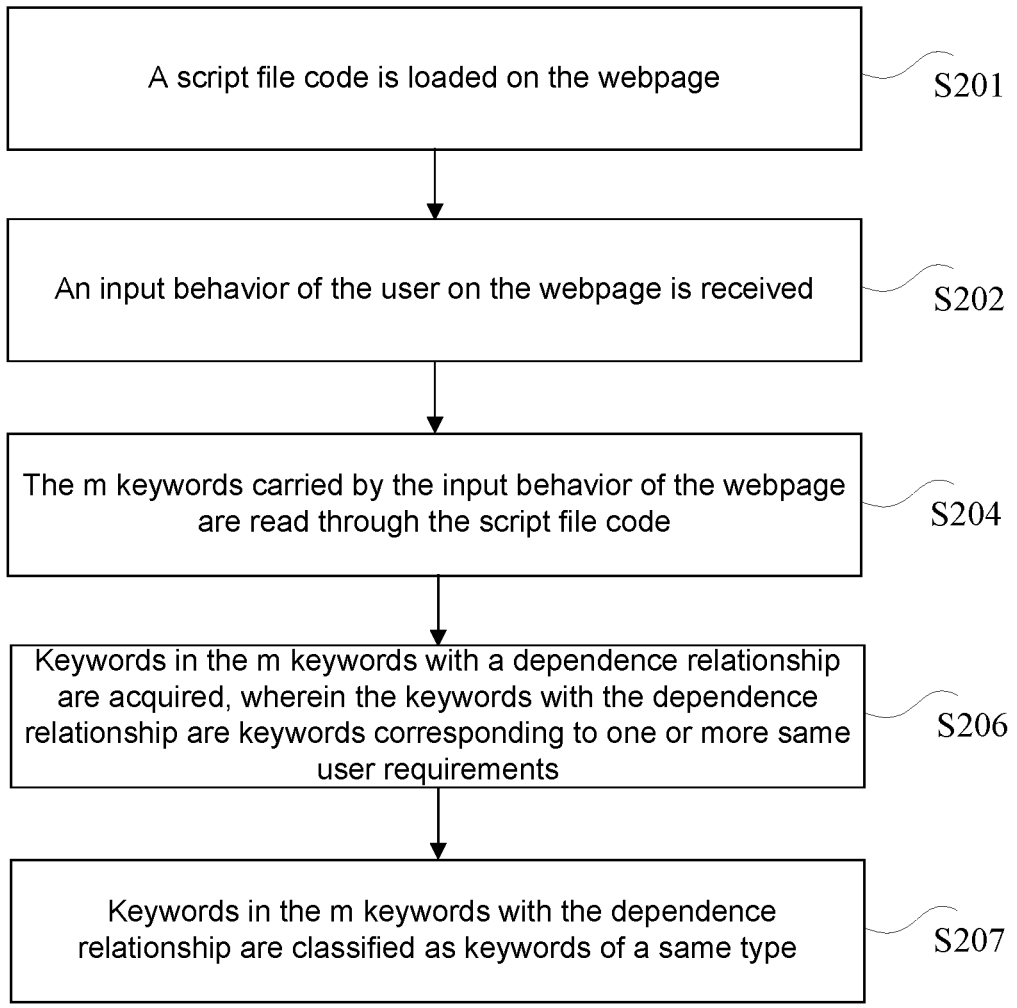
FIG. 2 is a flow diagram of a second embodiment of a data analyzing method according to the disclosure.

FIG. 2 is a flow diagram of a second embodiment of a method for analyzing webpage data according to the disclosure. This embodiment may be used as a preferred embodiment of the embodiment shown in FIG. 1. As shown in FIG. 2, the method for analyzing webpage data includes the following steps.

Step S201: A script file code is loaded on the webpage.

The script file is similar to a batch processing file in the DOS operating system, which can combine different commands and automatically and continuously execute in a determined order. Script programs are relatively close to natural language relative to normal program development and can be interpreted and executed without compilation.

There are many types of script language. The implementation of a general script language is only associated with the specific interpretation actuator. Therefore, as long as the system has an interpretive program of the corresponding language, the cross-platform can be realized. Preferably, the javascript code may be used in the present embodiment to acquire the behavior data of the user during webpage browsing by adding the javascript code to the website.

Step S202: An input behavior of the user on the webpage is received.

A user searches in the website, and the input data by the user can monitor and achieve dynamic read by a javascript code.

Step S204: The m keywords carried by the input behavior of the webpage are read through the script file code.

The website search behavior of the user in a session can constitute a sequence of the website search, expressed as [Keyword1, Keyword2, Keyword3, . . . ]. Each session is represented with a unique key, which can form the data in the following format:

| Session | Keyword |
|---------|---------|
| 1 | Keyword1 |
| 1 | Keyword2 |
| 2 | Keyword2 |
| ... | ... |

Herein the data includes, but is not limited to, the two columns such as sessions and keywords, and may include more dimensions such as search time, number of searches, and the like to improve the performance of the cluster.

Step S206: Keywords in the m keywords with a dependence relationship are acquired, wherein the keywords with the dependence relationship are keywords corresponding to one or more same user requirements.

This step is equivalent to S104, and will not be repeated here.

Step S207: Keywords in the m keywords with the dependence relationship are classified as keywords of a same type.

This step is equivalent to S106, and will not be repeated here.

In this embodiment, a specific step of analyzing the webpage data is given: loading a script file code on the webpage; receiving an input behavior of the user on the webpage; reading, through the script file code, the m keywords carried by the input behavior on the webpage; acquiring keywords in the m keywords with a dependence relationship; and classifying the keywords with the dependence relationship in the m keywords as keywords of a same type. Through the above steps, the keywords inputted by the user can be dynamically read, and the webpage data to be analyzed is accurately and efficiently acquired, which is conducive to the efficient clustering analysis on the user data.

Figure 3:
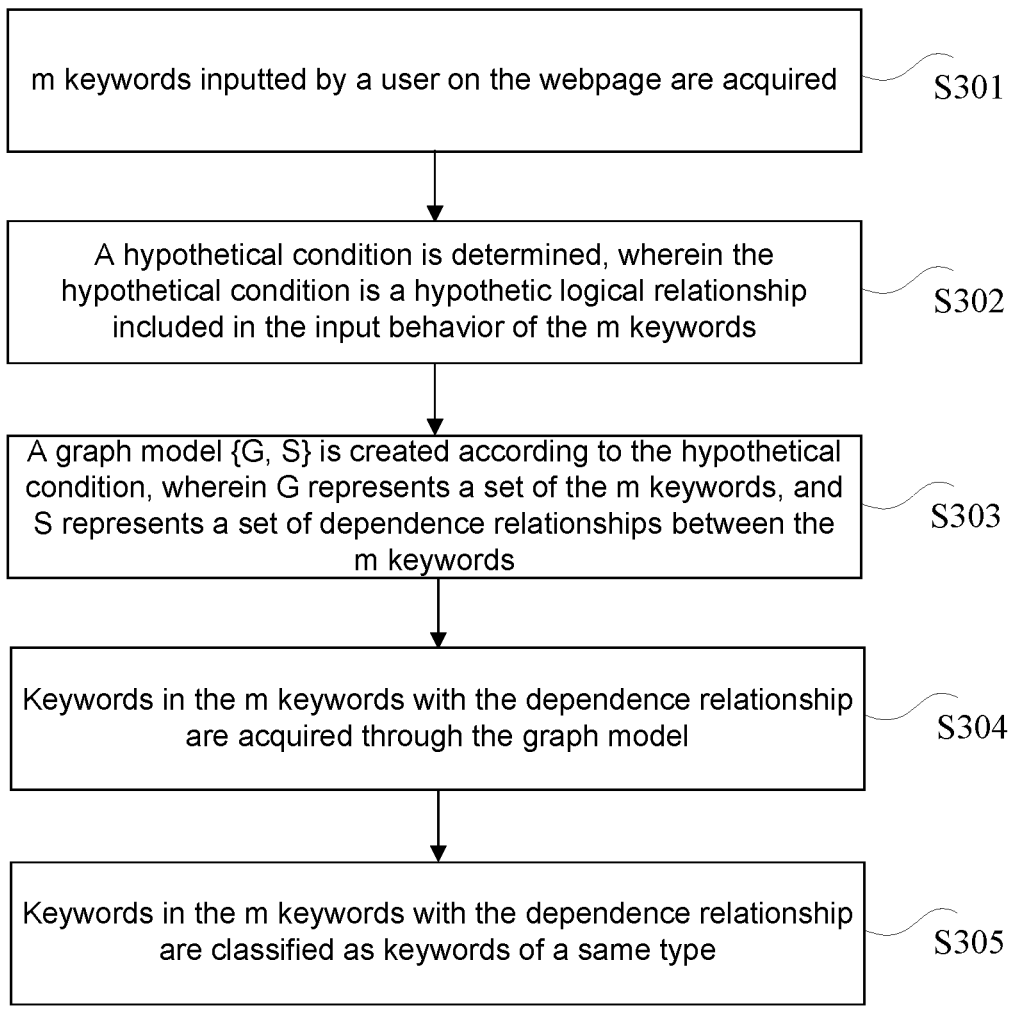
FIG. 3 is a flow diagram of a third embodiment of a data analyzing method according to the disclosure.

FIG. 3 is a flow diagram of a third embodiment of a method for analyzing webpage data according to the disclosure. This embodiment may be used as a preferred embodiment of the embodiment shown in FIG. 1. As shown in FIG. 3, the method for analyzing webpage data includes the following steps.

Step S301: m keywords inputted by a user on the webpage are acquired.

This step is equivalent to S102, and will not be repeated here.

In one embodiment, this step may be carried out by Steps S201, S202 and S204 in the above second embodiment, and the detailed description will not be repeated.

Step S302: A hypothetical condition is determined, wherein the hypothetical condition is a hypothetic logical relationship included in the input behavior of the m keywords.

The user requirement will certainly exists when the user conducts a search behavior. Reasonable hypothetical conditions can be put forward according to the actual business requirements of the webpage data analyst (namely, interested in which user requirements). According to the hypothetical conditions, the dependence relationship between the keywords can be acquired.

For example, the sequence of keywords for a session is A-B-C-D. The hypothetical conditions of this method can be to establish a dependence relationship {AD, BD, CD, DD}. Among them, A, B, and C establish a dependence relationship with D, respectively, that is, A and D correspond to the same user requirement (a first user requirement), B and D correspond to the same user requirement (a second user requirement), and C and D correspond to the same user requirement (a third user requirement). Different dependence relationship can be established according to other hypothetical conditions such as {AB, BC, CD} or {AB, AC, AD, BC, BD, CD}.

Optionally, the following hypothetical conditions can be made: 1, the same session has a unique visiting purpose when the user browses the website; 2, the website keywords generated by the user in the same session has relevance semantically; and 3, in the course of achieving the purpose of the visit, the user may have a number of website search behaviors, but these behaviors have their own characteristics of self-correction. Based on the above three assumptions, it can be concluded that the keyword used in the last website search is the attribution of all the keywords in the session. Based on this, the dependence relationship between keywords can be made clear.

Step S303: A graph model {G, S} is created according to the hypothetical condition, wherein G represents a set of the m keywords, and S represents a set of dependence relationships between the m keywords.

The graph model is a graph used to describe the system consisting of points (nodes) and lines (edges), which is used to describe the relationship between a thing (a node) and another thing (another node) in the system. Optionally, the graph model is a directed graph, and if each edge in the graph model is a directed graph, the graph is called a directed graph. In this embodiment, each node in the graph model represents a keyword, and each edge represents a dependence relationship between one keyword and another.

According to the assumption of Step S302, the directed graph {G, S} of m keywords are constructed, wherein G represents a set of m keywords in the graph, and each of keywords can be represented as a node in the graph; S represents a set of dependence relationships between the keywords in the graph, and represents the edge connecting between the two nodes in the graph, where the direction of the edge is determined by the dependence relationship of the two nodes, and the intensity of the edge is determined by the number of dependence relationships. According to the preferred hypothetical conditions in Step S302, all keywords have an edge pointing to the last keyword of the session in a single session.

Step S304: Keywords in the m keywords with the dependence relationship are acquired through the graph model.

The graph model gives a set of all keyword and keyword dependence relationships. Depending on the actual business requirements of the webpage data analyst, multiple key phrases representing the same user requirement can be identified.

The algorithm that a simple graph model finds a community performs query clustering, avoiding the traditional clustering algorithm and reducing the complexity.

Step S305: Keywords in the m keywords with the dependence relationship are classified as keywords of a same type.

This step is equivalent to S106, and will not be repeated here.

In this embodiment, a specific step of analyzing the webpage data is given: acquiring m keywords inputted by a user on the webpage; determining a hypothetical condition; creating a graph model {G, S} according to the hypothetical condition; acquiring keywords with the dependence relationship in the m keywords through the graph model; and classifying the keywords with the dependence relationship in the m keywords as keywords of a same type. In the above steps, since the different user requirements can set their own hypothetical conditions, the scope of webpage data analysis to which the method is applicable is more extensive, and a variety of user requirements of webpage data analysis can be met. At the same time, because the method is the relationship between the keywords established based on the logical relationship contained by the input behavior of the webpage, the user requirements can be accurately reflected.

Figure 4:
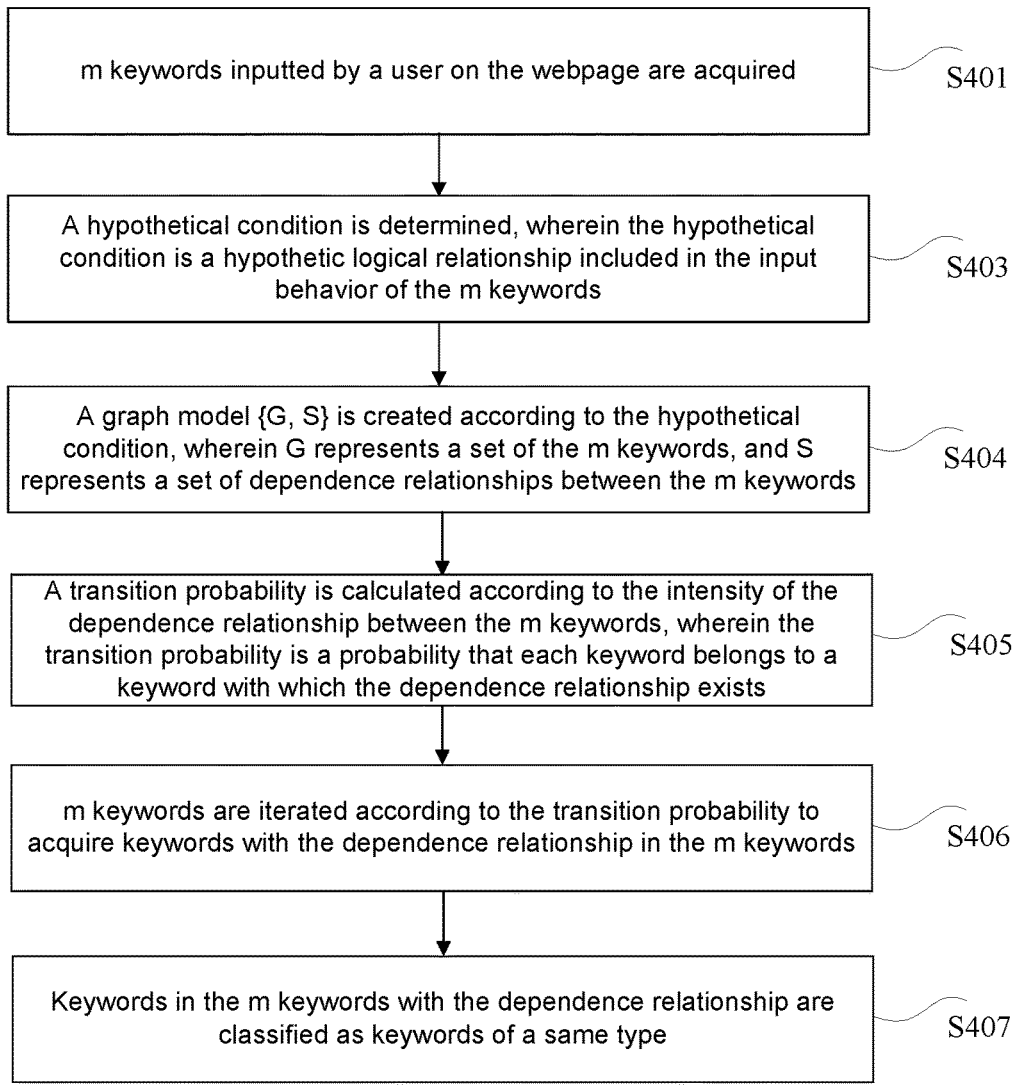
FIG. 4 is a flow diagram of a fourth embodiment of a data analyzing method according to the disclosure.

FIG. 4 is a flow diagram of a fourth embodiment of a data analyzing method according to the embodiments of the disclosure. This embodiment may be used as a preferred embodiment of the embodiment shown in FIG. 3. As shown in FIG. 4, the method for analyzing webpage data includes the following steps.

Step S401: m keywords inputted by a user on the webpage are acquired.

This step is equivalent to S301, and will not be repeated here.

Step S403: A hypothetical condition is determined, wherein the hypothetical condition is a hypothetic logical relationship included in the input behavior of the m keywords.

This step is equivalent to S302, and will not be repeated here.

Step S404: A graph model {G, S} is created according to the hypothetical condition, wherein G represents a set of the m keywords, and S represents a set of dependence relationships between the m keywords.

This step is equivalent to S303, and will not be repeated here.

Step S405: A transition probability is calculated according to the intensity of the dependence relationship between the m keywords, wherein the transition probability is a probability that each keyword belongs to a keyword with which the dependence relationship exists.

In the graph model, the intensity of the dependence relationship can be determined according to the number of dependence relationships. The more the number of the dependence relationships established between the two nodes, the greater the intensity of the dependence relationship between the two nodes. In this embodiment, the more the number of the dependence relationships established between the two keywords, the greater the intensity of the dependence relationship between the two keywords. According to the intensity of the dependence relationship between the keywords, the probability that the nodes depend on each node can be calculated, that is, the transition probability. The transition probability is defined as $c(n_i, n_j)/c(n_j)$, $c(n_i, n_j)$ is the intensity of the dependence relationship between the i-th webpage data and the j-th webpage data, $c(n_j)$ is the sum of the intensities of all dependence relationships of the jth webpage data, where i, $j \in \{1, 2 \ldots m\}$ and $i \neq j$.

Step S406: m keywords are iterated according to the transition probability to acquire keywords with the dependence relationship in the m keywords.

The nodes (keywords) are iterated according to the transition probability, and each node (keyword) is randomly moved to the node (keyword) to which it depends on with the transition probability. A number of iterations are performed to calculate the key phrases for the same user requirement to which the node (keyword) belongs after the final iteration.

In particular, a label propagation algorithm may be employed. It should be noted that the details of the label propagation algorithm is not the focus that this application will emphasize, that is, as long as the algorithm that can cluster a graph is within the scope of protection. Without losing the generality, the present application provides a following algorithm for the label propagation for clustering nodes in the graph.

In the set initial state, each node has a unique label, which can be the keyword of the last website search of the session where each search keyword is located. For each node, the contribution value of all the neighbor nodes that point to that node to the node replacing the label is calculated. The calculation method performs weighted summation on the label of the neighbor nodes, taking the transition probability between nodes as the weight. For example, if node A has neighbor nodes B, C, and D, the labels are x, x, and y, respectively, and the transition probability values for A are 0.2, 0.2, and 0.5, respectively, the choice that node A accepts the change is x (0.4=0.2+0.2) or y(0.5), and the label of node A is changed to y. When the node calculation changes may be equivalent, if the current label of the node is one of several possibilities in which they are equivalent, the node does not change its label, otherwise, all the possibilities are randomly selected and the label is replaced.

It should be noted at the same time that the above method can be used in the present application. In a label propagation process, all the nodes in the graph are updated synchronously, that is, all nodes are iterated at one time, and contribution value distribution that is instantaneously received is calculated simultaneously, and then the label operation is updated. There is no sequential order of node label changes in the process.

Finally, the above iteration process is repeated several times until the label of all nodes no longer changes, and the calculation is terminated. However, for the actual situation, because the number of nodes in the figure is huge, the iterative process often does not wait until the final stop process (need too many iterations to stop), but the preset number of iterations is chosen. After the number of iterations, the current result is regarded as an approximate clustering result.

The above random moving process is repeated for many times. It is determined that the final node (keyword) belongs to the final key phrase (keyword cluster) according to the law of large numbers. It is necessary to repeat the process for many times because the directed graph constructed at the beginning of the model is a directed and circled graph. Therefore, it is possible for the node to enter the ring through the transition probability to acquire the local optimal solution. The repeating steps can effectively reduce this error, so that the accuracy of clustering is improved.

Step S407: Keywords in the m keywords with the dependence relationship are classified as keywords of a same type.

This step is equivalent to S106, and will not be repeated here.

In this embodiment, a specific step of analyzing the webpage data is given: acquiring m keywords inputted by a user on the webpage; determining a hypothetical condition; creating a graph model {G, S} according to the hypothetical condition; calculating a transition probability according to intensities of the dependence relationships between the m keywords; performing iteration on the m keywords according to the transition probability to acquire keywords with the dependence relationship in the m keywords; and classifying the keywords with the dependence relationship in the m keywords as keywords of a same type. In the above steps, using the iterative approach, the keywords in the keywords to be analyzed belonging to the same user requirement gradually become a class, this clustering manner is more in line with the real user requirements, and the clustering results have more analytical value.

Figure 5:
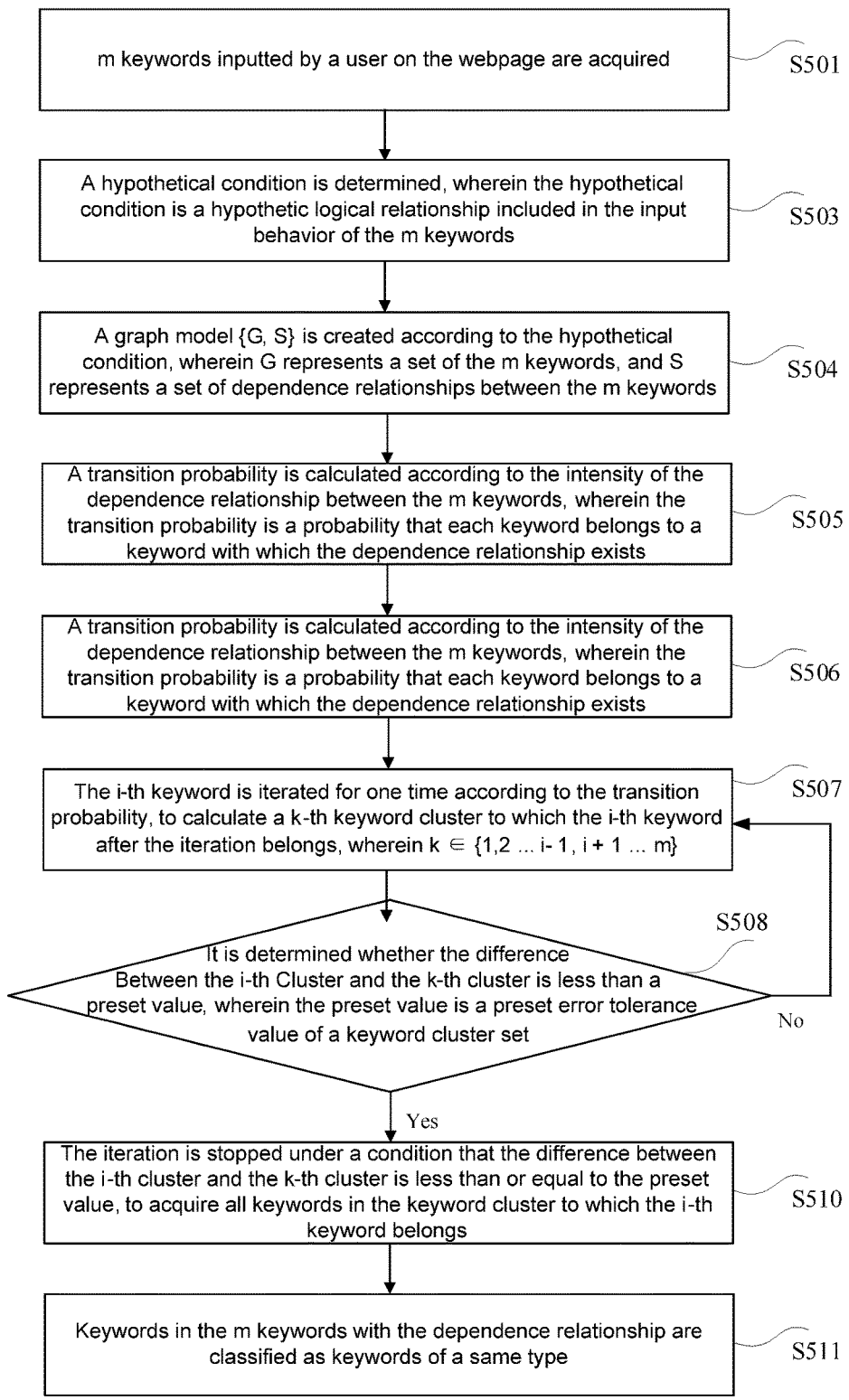
FIG. 5 is a flow diagram of a fifth embodiment of a data analyzing method according to the disclosure.

FIG. 5 is a flow diagram of a fifth embodiment of a data analyzing method according to the embodiments of the disclosure. This embodiment may be used as a preferred embodiment of the embodiment shown in FIG. 4. As shown in FIG. 5, the method for analyzing webpage data includes the following steps.

Step S501: m keywords inputted by a user on the webpage are acquired.

This step is equivalent to S301, and will not be repeated here.

Step S503: A hypothetical condition is determined, wherein the hypothetical condition is a hypothetic logical relationship included in the input behavior of the m keywords.

This step is equivalent to S302, and will not be repeated here.

Step S504: A graph model {G, S} is created according to the hypothetical condition, wherein G represents a set of the m keywords, and S represents a set of dependence relationships between the m keywords.

This step is equivalent to S303, and will not be repeated here.

Step S505: A transition probability is calculated according to the intensity of the dependence relationship between the m keywords, wherein the transition probability is a probability that each keyword belongs to a keyword with which the dependence relationship exists.

This step is equivalent to S405, and will not be repeated here.

Step S506: It is assumed that an i-th keyword belongs to an i-th keyword cluster before the iteration is performed, wherein the cluster is a set of a type of keywords, i=1, 2 . . . m;

At the time of initialization, it is assumed that all the nodes (keywords) in the graph belong to a cluster of keywords (each holding their own one-time voting opportunity), starting with each node and starting iteration.

Step S507: The i-th keyword is iterated for one time according to the transition probability, to calculate a k-th keyword cluster to which the i-th keyword after the iteration belongs, wherein k∈{1, 2 . . . i−1, i+1 . . . m};

During the iteration, each node randomly moves to its dependent node with the transition probability. As the iteration progresses, the keywords that reflect the same user requirement will be more until the keyword cluster covers all the keywords that have the dependence relationship in the m keywords.

Step S508: It is determined whether the difference between the i-th cluster and the k-th cluster is less than a preset value, wherein the preset value is a preset error tolerance value of a keyword cluster set;

The preset value can be set according to the requirement of different data analysts.

If the keyword cluster that the node belongs to is acquired each time iteration is performed, the keyword cluster is compared with the keyword cluster that the node belongs to before the iteration. Then the difference between the current keyword cluster and the previous keyword cluster is determined, where the difference between the current keyword cluster and the previous keyword cluster is defined as: the difference value=the number of nodes of the key cluster that the change belongs to/the total number of nodes (diff=nchange/N). Through this determining step, it is possible to make the ith keyword close to the keyword cluster which the ith keyword belongs to step by step.

Step S509: The iteration is continued under a condition that the difference between the i-th cluster and the k-th cluster is greater than the preset value.

This step repeats Step S507. When the difference between the i-th keyword cluster and the k-th keyword cluster is larger than the preset value, it is necessary to continue the iteration by indicating that the keyword that reflects the same user requirement has not been completely covered into the keyword cluster.

Step S510: The iteration is stopped under a condition that the difference between the i-th cluster and the k-th cluster is less than or equal to the preset value, to acquire all keywords in the keyword cluster to which the i-th keyword belongs.

When the difference between the i-th keyword cluster and the k-th keyword cluster is less than or equal to the preset value, it can be considered that the keyword that reflects the same user requirement has been completely covered into the keyword cluster.

Optionally, the number of iterations may be set according to the analysis requirement of the data analyst. When the preset iteration number is completed, all the keywords in the keyword cluster to which the i-th keyword belongs are acquired.

Step S511: Keywords in the m keywords with the dependence relationship are classified as keywords of a same type.

This step is equivalent to S106, and will not be repeated here.

In this embodiment, a specific step of analyzing the webpage data is given: acquiring m keywords inputted by a user on the webpage; determining a hypothetical condition; creating a graph model {G, S} according to the hypothetical condition; calculating a transition probability according to intensities of the dependence relationships between the m keywords; assuming that an i-th keyword belongs to an i-th keyword cluster before the iteration is performed; performing iteration on the i-th keyword for one time according to the transition probability, to calculate a k-th keyword cluster to which the i-th keyword after the iteration belongs; determining whether the difference between the i-th cluster and the k-th cluster is less than a preset value; continuing the iteration under a condition that the difference between the i-th cluster and the k-th cluster is greater than the preset value; stopping the iteration under a condition that the difference between the i-th cluster and the k-th cluster is less than or equal to the preset value, to acquire all keywords in the keyword cluster to which the i-th keyword belongs; and classifying the keywords with the dependence relationship in the m keywords as keywords of a same type. In the above steps, since the preset value can be set according to the user requirement, that is, the error range of the keyword cluster can be set by itself, the requirement of the different data analysts can be met so that the scope of application of the method is increased. At the same time, this repeated iterative manner also makes the clustering results more accurate.

Figure 6:
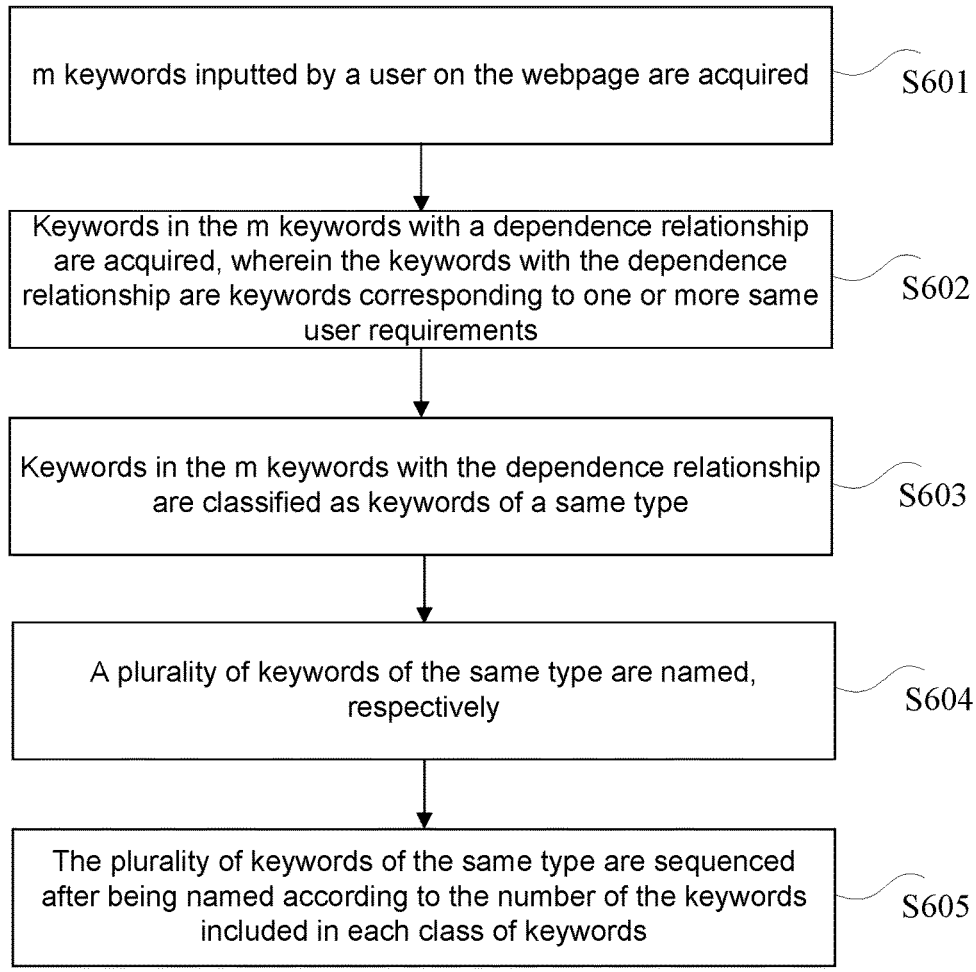
FIG. 6 is a flow diagram of a sixth embodiment of a data analyzing method according to the disclosure.

FIG. 6 is a flow diagram of a sixth embodiment of a method for analyzing webpage data according to the disclosure. This embodiment may be used as a preferred embodiment of the embodiment shown in FIG. 1. As shown in FIG. 6, the method for analyzing webpage data includes the following steps.

Step S601: m keywords inputted by a user on the webpage are acquired.

This step is equivalent to S102, and will not be repeated here.

In one embodiment, this step may be carried out by Steps S201, S202 and S204 in the above second embodiment, and the detailed description will not be repeated.

Step S602: Keywords in the m keywords with a dependence relationship are acquired, wherein the dependence relationship is between corresponding keywords having the same user requirement.

This step is equivalent to S104, and will not be repeated here.

In one embodiment, this step may be carried out by Steps S503-S510 in the above fifth embodiment, and the detailed description will not be repeated.

Step S603: Keywords in the m keywords with the dependence relationship are classified as keywords of a same type.

This step is equivalent to S106, and will not be repeated here.

Step S604: A plurality of keywords of the same type are named, respectively.

As each of the same type of keywords reflects different user requirements, the acquired keywords of the same class can be named in order to describe the user requirements.

Preferably, the naming method may be a rule-based naming method and a statistics-based naming method, or a combination of the two methods, i.e., a mixed to naming method. The naming methods of the same type of keywords include but not limited to: naming according to the number of user searches or the number of clicks when a user searches, selecting the keywords with higher ranking as the naming; performing a maximum likelihood estimation according to the convergence point when the graph model has convergence, and naming with the keywords of the centralized convergence.

Step S605: The plurality of keywords of the same type are sequenced after being named according to the number of the keywords included in each type of keywords.

Sequencing refers to sequencing according to the statistics of the same type of keywords, and user requirement corresponding to the higher statistics of the same type of keywords (keyword cluster) is stronger. Preferably, the commonly used statistics include the number of keyword searches in the cluster and the number of sessions to which the keyword in the cluster belongs.

In this embodiment, a specific step of analyzing the webpage data is given: acquiring m keywords inputted by a user on the webpage; acquiring keywords in the m keywords with a dependence relationship; classifying the keywords with the dependence relationship in the m keywords as keywords of a same type; naming a plurality of keywords of the same type, respectively; and sequencing, according to the number of the keywords included in each type of keywords, the plurality of named keywords of the same type. Through the above steps, each type of keywords acquired by clustering are named respectively, and are sequenced according to the number of keywords contained in each type of keywords, so that the search popularity of each type of data is more clearly displayed, and the result is more intuitively presented to webpage data analysts.

Figure 7:
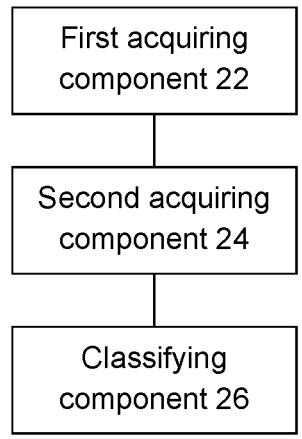
FIG. 7 is a structure block diagram of a first embodiment of a data analyzing device according to the disclosure.

FIG. 7 is a structure block diagram of a first embodiment of a data analyzing device according to the embodiments of the disclosure. As shown in FIG. 7, the device structure includes the following components.

A first acquiring component 22 is arranged to acquire m keywords inputted by a user on the webpage.

There are many-to-many dependence relationships between the user requirement and the keywords inputted by the user, that is, each user requirement can represent the intention by the different keywords inputted by the user, and each keyword can also represent the intention of multiple different user requirements. In order to simplify the problem, a one-to-many dependence relationship between the user requirements and the keywords inputted by the user is defined. The device can identify user requirements by clustering the keywords inputted by the user in the website.

A second acquiring component 24 is arranged to acquire keywords in the m keywords with a dependence relationship, wherein the dependence relationship is between corresponding keywords having the same user requirement; and for a webpage data search behavior of the user, a relationship exists between the various searched keywords. This relationship is not the literal similarity of each keyword, but the user requirements reflected by the keywords are the same. For example, when a user searches for a webpage, there may be the following dependence relationship between the keywords that are searched: a keyword is the attribution of the previous keyword ($k_i = f(k_{i-1})$), or the latter keyword is the attribution of all the previous keywords ($K_i = f(k_{i-1}, k_{i-2}, k_{i-3}, \ldots, k_1)$), and so on. The component is arranged to acquire keywords in the m keywords with a dependence relationship.

A classifying component 26 is arranged to classify the keywords with the dependence relationship in the m keywords as keywords of a same type.

Because a type of keywords with dependence relationship correspond to one or more same user requirements, the keywords inputted by the user can be divided into several types according to the dependence relationship. In this clustering manner realized by the device, the deep keyword aggregation relationship can be excavated, so as to accurately represent the user requirement. For example, the relationship between "violation of regulation", "electronic eyes", "electronic jin" and "electronic police" can be found by the device.

The device for analyzing webpage data provided by the embodiment includes a first acquiring component 22, a second acquiring component 24, and a classifying component 26. The device enables the webpage data analysis to be based on the dependence relationship between the keywords determined by the user requirement, rather than unilaterally depend on the degree of literal overlap between keywords. This device breaks through the limitations of the traditional query aggregation process based on the assumption that the query itself matches literally, and uses the user behavior data to carry out data mining so that the acquired clustering result can reflect the user requirement more accurately.

Figure 8:
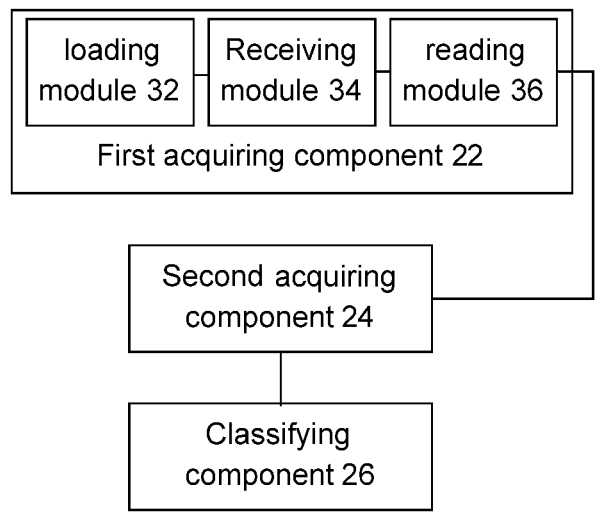
FIG. 8 is a structure block diagram of a second embodiment of a data analyzing device according to the disclosure.

FIG. 8 is a structure block diagram of a second embodiment of a data analyzing device according to the embodiments of the disclosure. This embodiment may be used as a preferred embodiment of the embodiment shown in FIG. 7. As shown in FIG. 8, the device for analyzing webpage data includes:

a first acquiring component 22, a second acquiring component 24, and a classifying component 26, wherein the second acquiring component 24 and the classifying component 26 are the same as those described in FIG. 7 and will not be described again. The first acquiring component 22 may further include the following modules.

A loading module 32 is arranged to load a script file code on the webpage.

The script file is similar to a batch processing file in the DOS operating system, which can combine different commands and automatically and continuously execute in a determined order. Script programs are relatively close to natural language relative to normal program development and can be interpreted and executed without compilation.

There are many types of script language. The implementation of a general script language is only associated with the specific interpretation actuator. Therefore, as long as the system has an interpretive program of the corresponding language, the cross-platform can be realized. Preferably, the module may use the javascript code to acquire the behavior data of the user during webpage browsing by adding the javascript code to the website.

A receiving module 34 is arranged to receive an input behavior of the user on the webpage.

A user searches in the website, and the receiving module 34 can receive the input data and can monitor and achieve dynamic read by a javascript code.

A reading module 36 is arranged to read, through the script file code, the m keywords carried by the input behavior on the webpage.

The website search behavior of the user in a session can constitute a sequence of the website search, expressed as [Keyword1, Keyword2, Keyword3, . . . ]. Each session is represented with a unique key, which can form the data in the following format:

| Session | Keyword |
|---------|---------|
| 1 | Keyword1 |
| 1 | Keyword2 |
| 2 | Keyword2 |
| ... | ... |

Herein the data includes, but is not limited to, the two columns such as sessions and keywords, and may include more dimensions such as search time, number of searches, and the like to improve the performance of the cluster.

The first acquiring component 22 in the device for analyzing webpage data provided by the present embodiment may further include the following modules: a loading module 32, a receiving module 34, and a reading module 36. Through the above modules, the keywords inputted by the user can be dynamically read, and the webpage data to be analyzed is accurately and efficiently acquired, which is conducive to the efficient clustering analysis on the user data.

Figure 9:
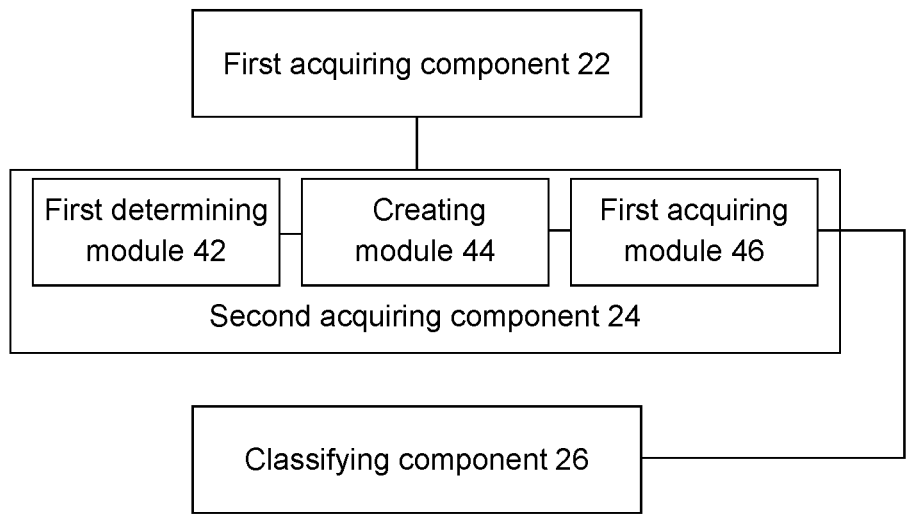
FIG. 9 is a structure block diagram of a third embodiment of a data analyzing device according to the disclosure.

FIG. 9 is a structure block diagram of a third embodiment of a data analyzing device according to the embodiments of the disclosure. This embodiment may be used as a preferred embodiment of the embodiment shown in FIG. 7. As shown in FIG. 9, the device for analyzing webpage data includes:

a first acquiring component 22, a second acquiring component 24, and a classifying component 26, wherein the first acquiring component 22 and the classifying component 26 are the same as those described in FIG. 7 and will not be described again. The second acquiring component 24 may further include the following modules.

A first determining module 42 is arranged to determine a hypothetical condition, wherein the hypothetical condition is a hypothetic logical relationship included in the input behavior of the m keywords;

The user requirement will certainly exists when the user conducts a search behavior. The first determining module 42 can acquire reasonable hypothetical conditions put forward by the webpage data analyst according to the actual business requirements of the webpage data analyst. It should be noted that the hypothetical conditions reflect the dependence relationship between the keywords.

For example, the sequence of keywords for a session is A-B-C-D. The hypothetical conditions can be to establish a dependence relationship {AD, BD, CD, DD}. Different dependence relationship can be established according to other hypothetical conditions such as {AB, BC, CD} or {AB, AC, AD, BC, BD, CD}.

Preferably, the following hypothetical conditions can be made: 1, the same session has a unique visiting purpose when the user browses the website; 2, the website keywords generated by the user in the same session has relevance semantically; and 3, in the course of achieving the purpose of the visit, the user may have a number of website search behaviors, but these behaviors have their own characteristics of self-correction. Based on the above three assumptions, it can be concluded that the keyword used in the last website search is the attribution of all the keywords in the session. Based on this, the dependence relationship between keywords can be made clear.

A creating module 44 is arranged to creat a graph model {G, S} according to the hypothetical condition, wherein G represents a set of the m keywords, and S represents a set of dependence relationships between the m keywords; and According to the hypothetical conditions determined by the first determining module 42, the creating module 44 can construct the directed graph {G, S} of m keywords, wherein G represents a set of m keywords in the graph, and each of keywords can be represented as a node in the graph; S represents a set of dependence relationships between the keywords in the graph, and represents the edge connecting between the two nodes in the graph, where the direction of the edge is determined by the dependence relationship of the two nodes, and the intensity of the edge is determined by the number of dependence relationships. According to the preferred hypothetical conditions introduced above, all keywords have an edge pointing to the last keyword of the session in a single session.

A first acquiring module 46 is arranged to acquire keywords with the dependence relationship in the m keywords through the graph model.

The graph model gives a set of all keyword and keyword dependence relationships. Depending on the actual business requirements of the webpage data analyst, the first acquiring module 46 can identify multiple key phrases representing the same user requirement.

The first acquiring module 46 uses the algorithm that a simple graph model finds a community to perform query clustering, avoiding the traditional clustering algorithm and reducing the complexity O (nlgn).

The second acquiring component 24 in the device for analyzing webpage data provided by the present embodiment may further include a first determining module 42, a creating module 44, and a first acquiring module 46. through the above module, since the first determining module 42 can set their own hypothetical conditions according to the different user requirements, the scope of webpage data analysis to which the device is applicable is more extensive, and a variety of user requirements of webpage data analysis can be met. At the same time, because the device is the relationship between the keywords established based on the logical relationship contained by the input behavior of the webpage, the user requirements can be accurately reflected.

The following is a fourth embodiment of the device for analyzing webpage data according to the embodiments of the disclosure. This embodiment may be used as a preferred embodiment of the third embodiment of the device. The device for analyzing webpage data includes:

a first acquiring component 22, a second acquiring component 24, and a classifying component 26, wherein the second acquiring component 24 includes a first determinating module 42, a creating module 44, and a first acquiring module 46. Except the first acquiring module 46, the other components and modules are the same as those in FIG. 7, and will not be described here. The first acquiring module 46 may also include the following modules.

A calculating module is arranged to calculate a transition probability according to intensities of the dependence relationships between the m keywords, wherein the transition probability is a probability that each keyword belongs to a keyword with which the dependence relationship exists; and The calculating module can calculate the probability that the nodes depend on each node according to the intensity of the dependence relationship between the keywords, that is, the transition probability. The transition probability can be defined as $c\,(n_i,\,n_j)/c\,(n_j)$, $c\,(n_i,\,n_j)$ is the intensity of the dependence relationship between the i-th webpage data and the j-th webpage data, $c\,(n_j)$ is the sum of the intensities of all dependence relationships of the jth webpage data, where i, j$\in$\{1, 2 . . . m\} and i$\neq$j.

A second acquiring module is arranged to perform iteration on the m keywords according to the transition probability to acquire keywords with the dependence relationship in the m keywords.

The module peforms iteration on the nodes (keywords) according to the transition probability, and each node (keyword) is randomly moved to the node (keyword) to which it depends on with the transition probability. A number of iterations are performed and the module can output the key phrases for the same user requirement to which the node (keyword) belongs after the final iteration.

In this module, the above random moving process is repeated for many times. It is determined that the final node (keyword) belongs to the final key phrase (keyword cluster) according to the law of large numbers. It is necessary to repeat the process for many times because the directed graph constructed at the beginning of the model is a directed and circled graph. Therefore, it is possible for the node to enter the ring through the transition probability to acquire the local optimal solution. The repeating steps can effectively reduce this error, so that the accuracy of clustering results acquired by the module is improved.

The first acquiring module 46 in the webpage data analysis device provided by the embodiment may further include the following modules: a calculating module and a second acquiring module. Since the second acquiring module uses the iterative approach so that the keywords in the keywords to be analyzed belonging to the same user requirement gradually become a class, this clustering manner is more in line with the real user requirements, and the clustering results have more analytical value.

The following is a fifth embodiment of the device for analyzing webpage data according to the embodiments of the disclosure. This embodiment can be used as a preferred embodiment of the fourth embodiment of the device. The device for analyzing webpage data includes:

a first acquiring component 22, a second acquiring component 24, and a classifying component 26, wherein the second acquiring component 24 includes a first determinating module 42, a creating module 44, and a first acquiring module 46, and the first acquiring module 46 further includes a calculating module and a second acquiring module. Here, except the second acquiring module, the other components and modules are the same as those described in FIG. 10, and will not be described here. The second acquiring module may further include the following modules.

An assuming sub-module is arranged to assume that an i-th keyword belongs to an i-th keyword cluster before the iteration is performed, wherein the cluster is a set of a type of keywords, i=1, 2 . . . m.

At the time of initialization, it is assumed that all the nodes (keywords) in the graph belong to a cluster of keywords (each holding their own one-time voting opportunity).

A calculating sub-module is arranged to perform iteration on the i-th keyword for one time according to the transition probability, to calculate a k-th keyword cluster to which the i-th keyword after the iteration belongs, wherein k∈{1, 2 . . . i−1, i+1 . . . m}.

During the iteration performed by the sub-module, each node randomly moves to its dependent node with the transition probability. As the iteration progresses, the keywords that reflect the same user requirement will be more until the keyword cluster covers all the keywords that have the dependence relationship in the m keywords.

A determining sub-module is arranged to determine whether the difference between the i-th cluster and the k-th cluster is less than a preset value, wherein the preset value is a preset error tolerance value of a keyword cluster set.

The preset value can be set according to the requirement of different data analysts and the data is input to the sub-module.

If the keyword cluster that the node belongs to is acquired each time iteration is performed, the keyword cluster is compared with the keyword cluster that the node belongs to before the iteration. Then the sub-module determines the difference between the current keyword cluster and the previous keyword cluster, where the difference between the current keyword cluster and the previous keyword cluster is defined as: the difference value=the number of nodes of the key cluster that the change belongs to/the total number of nodes (diff=nchange/N). Through this determining process of the sub-module, it is possible to make the ith keyword close to the keyword cluster which the ith keyword belongs to step by step.

An iterating sub-module is arranged to continue the iteration under a condition that the difference between the i-th cluster and the k-th cluster is greater than the preset value.

When the difference between the i-th keyword cluster and the k-th keyword cluster is larger than the preset value, the iterating sub-module continues the iteration by indicating that the keyword that reflects the same user requirement has not been completely covered into the keyword cluster.

An acquiring sub-module is arranged to stop the iteration under a condition that the difference between the i-th cluster and the k-th cluster is less than or equal to the preset value, to acquire all keywords in the keyword cluster to which the i-th keyword belongs.

When the difference between the i-th keyword cluster and the k-th keyword cluster is less than or equal to the preset value, it can be considered that the keyword that reflects the same user requirement has been completely covered into the keyword cluster.

Optionally, the determining sub-module may also determine the number of iterations according to the analysis requirement of the data analyst. When it is determined that the preset iteration number is completed, the acquiring sub-module acquires all the keywords in the keyword cluster to which the i-th keyword belongs.

The second acquiring module in the webpage data analysis device provided by the present embodiment may further include a following module: an assuming sub-module, a calculating sub-module, a determining sub-module, an iterating sub-module, and an acquiring sub-module. Since the determining sub-module can set the preset value according to the user requirement, that is, the error range of the cluster, the requirement of the different data analysts can be met so that the scope of application of the method is increased. At the same time, the iterating sub-module performs repeated iterations so that the final clustering results are more accurate.

Figure 10:
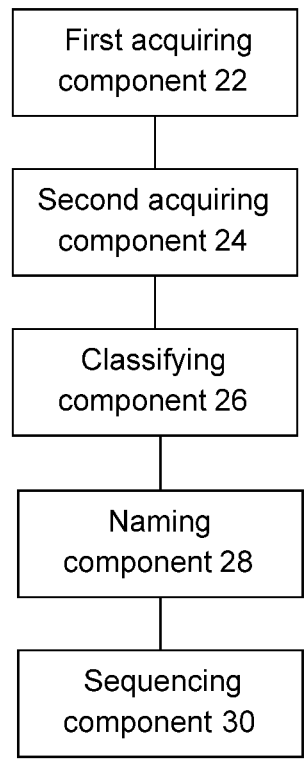
FIG. 10 is a structure block diagram of a sixth embodiment of a data analyzing device according to the disclosure.

FIG. 10 is a structure block diagram of a sixth embodiment of a data analyzing device according to the embodiments of the disclosure. This embodiment may be used as a preferred embodiment of the embodiment shown in FIG. 7. As shown in FIG. 10, the device for analyzing webpage data includes.

a first acquiring component 22, a second acquiring component 24, a classifying component 26, a naming component 28 and a sequencing component 30, wherein the first acquiring component 22, a second acquiring component 24 and the classifying component 26 are the same as those described in FIG. 7 and will not be described again. The naming component 28 and the sequencing component 30 are specifically as follows.

The naming component 28 is arranged to name a plurality of keywords of the same type, respectively.

As each of the same type of keywords reflects different user requirements, the acquired keywords of the same class can be named by the naming component 28 in order to describe the user requirements.

Preferably, the naming method may be a rule-based naming method and a statistics-based naming method, or a combination of the two methods, i.e., a mixed naming method. The naming methods of the same type of keywords include but not limited to: naming according to the number of user searches or the number of clicks when a user searches, selecting the keywords with higher ranking as the naming; performing a maximum likelihood estimation according to the convergence point when the graph model has convergence, and naming with the keywords of the centralized convergence.

The sequencing component 210 is arranged to sequence, according to the number of the keywords included in each type of keywords, the plurality of named keywords of the same type.

Sequencing refers to sequencing according to the statistics of the same type of keywords, and user requirement corresponding to the higher statistics of the same type of keywords (keyword cluster) is stronger. Preferably, the commonly used statistics include the number of keyword searches in the cluster and the number of sessions to which the keyword in the cluster belongs.

The device for analyzing webpage data provided by the present embodiment may also include the following components: a naming component 28 and a sequencing component 210. Through the naming component 28, each cluster acquired by clustering is named respectively, and the sequencing component 210 sequences the cluster according to the number of keywords contained in each cluster, so that each cluster more clearly displays the search popularity of each type of data, and more intuitively presents the clustering result to webpage data analysts.

It should be noted that in the above embodiment of the device for analyzing webpage data of the embodiments of the disclosure, each of the components and modules may be operated as a part of the device in a mobile terminal, a computer terminal, or a similar arithmetic device, and may perform the functions implemented by the above component and module by the processor in a mobile terminal, a computer terminal, or a similar arithmetic device, and may also be stored as a part of the storage medium. The mobile terminal, the computer terminal, or the similar arithmetic device described above may be terminal devices such as smartphones (such as Android phones, iOS phones, etc.), tablet PCs, palm computers, and Mobile Internet Devices (MIDs), and PADs.

Thus, embodiments of the disclosure may provide a computer terminal that may be any of a computer terminal device in a computer terminal group. Optionally, in the embodiment of the disclosure, the above computer terminal may be replaced with a terminal device such as a mobile terminal.

Optionally, in the embodiment of the disclosure, the above computer terminal may be located in at least one of the plurality of network devices in the computer network.

In the embodiment of the disclosure, the above computer terminal may execute the program code of the following steps in the method for analyzing webpage data: acquiring m keywords inputted by a user on the webpage; acquiring keywords in the m keywords with a dependence relationship, wherein the keywords with the dependence relationship are keywords corresponding to one or more same user requirements; and classifying the keywords with the dependence relationship in the m keywords as keywords of a same type.

Optionally, the computer terminal may include one or more processors, memories, and transmission devices.

Herein the memory can be used to store software programs and modules, such as program instructions/modules corresponding to the method for analyzing webpage datas and device in the embodiments of the disclosure, and the processor performs various function applications and data processing by running software programs and modules stored in the memory, that is, achieving the above method for analyzing webpage data. The memory may include a high-speed random access memory, and may include a non-volatile memory such as one or more magnetic storage devices, flash memories, or other non-volatile solid state memories. In some examples, the memory may further include a memory remotely provided with respect to the processor, which may be connected to the terminal via a network. Examples of such networks include, but are not limited to, the Internet, the intranet, the local area network, the mobile communication network, and combinations thereof.

The above transmission device is for receiving or transmitting data via a network. The specific example of the above network may include a wired network and a wireless network. In one example, the transmission device includes a Network Interface Controller (NIC) that can be connected to the router via a network cable and other network devices to communicate with the Internet or the local area network. In one example, the transmission device is a Radio Frequency (RF) module for wirelessly communicating with the Internet.

Herein specifically, the memory is used for storing information of a preset action condition and a preset privileged user and an application program.

The processor may call the information and application program stored in the memory by means of the transmission device to execute the program code of the method steps of various optional or preferred embodiments in the above method embodiments.

It will be understood by those of ordinary skill in the art that computer terminals may also be terminal devices such as smartphones (such as Android phones, iOS phones, etc.), tablet PCs, palm computers, and MIDs, and PADs.

It will be understood by those of ordinary skill in the art that all or a part of steps in the various methods of the above embodiments may be accomplished by a program instructing the terminal device related hardware, and the program may be stored in a computer readable storage medium. The storage medium may include: a flash disk, a Read-Only Memory (ROM), a Random Access Memory (RAM), a magnetic disk or an optical disk.

The embodiment of the disclosure also provides a storage medium. Alternatively, in the embodiment of the disclosure, the above storage medium may be used for storing the program code executed by the method for analyzing webpage data provided by the method embodiment and the device embodiment described above.

Optionally, in the embodiment of the disclosure, the above storage medium may be located in any of the computer terminals in the computer terminal group in the computer network or in any of the mobile terminals in the mobile terminal group.

Optionally, in the embodiment of the disclosure, the storage medium is arranged to store the program code for performing the following steps: acquiring m keywords inputted by a user on the webpage; acquiring keywords in the m keywords with a dependence relationship, wherein the keywords with the dependence relationship are keywords corresponding to one or more same user requirements; and classifying the keywords with the dependence relationship in the m keywords as keywords of a same type.

Optionally, in the present embodiment, the storage medium may also be arranged to store the program code of various preferred or optional method steps provided by the method for analyzing webpage data.

The method and device for analyzing webpage data according to the disclosure are described in an exemplary manner with reference to the accompanying drawings. However, it will be understood by those skilled in the art that various modifications may be made to the above method and device for analyzing webpage data proposed in the disclosure without departing from the content of the disclosure. Accordingly, the scope of protection of the disclosure should be determined by the content of the appended claims.

Obviously, those skilled in the art should know that each module or step of the embodiment of the disclosure may be implemented by a universal computing device, and the modules or steps may be concentrated on a single computing device or distributed on a network formed by a plurality of computing devices, and may optionally be implemented by programmable codes executable for the computing devices, so that the modules or steps may be stored in a storage device for execution with the computing devices, or the modules or steps may form each integrated circuit module, or multiple modules or steps therein may form a single integrated circuit module for implementation. As a consequence, the disclosure is not limited to any specific hardware and software combination.

Each of the embodiments in this specification is described in a progressive manner, and the same or similar parts among each of the embodiments can refer to each other. Each embodiment is focused on the differences from other embodiments. In particular, for a system embodiment, since it is substantially similar to the method embodiment, the description is relatively simple and the relevant aspects are described in the part of the method embodiment.

The above is only the preferred embodiment of the disclosure and not intended to limit the disclosure, and for the technician of the field, the disclosure may have various modifications and variations. Any modifications, equivalent replacements, improvements and the like within the spirit and principle of the disclosure shall fall within the scope of protection as defined in the disclosure.

What is claimed is:

1. A method for analyzing webpage data, which method is executed by a computer terminal including one or more processors, memories, and transmission devices, comprising:
   acquiring m keywords inputted by a user on a webpage, wherein m is a natural number greater than one;
   acquiring keywords with a dependence relationship in the m keywords, wherein the keywords with the dependence relationship are keywords corresponding to one or more same user requirements; and
   classifying the keywords with the dependence relationship in the m keywords as keywords of a same type;
   wherein acquiring the m keywords inputted by the user on the webpage comprises:
      loading a script file code on the webpage;
      receiving an input behavior of the user on the webpage, wherein the input behavior is a behavior of inputting keywords on the webpage; and
      reading, through the script file code, the m keywords carried by the input behavior on the webpage;
   wherein acquiring keywords with the dependence relationship in the m keywords comprises:
      determining a hypothetical condition, wherein the hypothetical condition is a hypothetic logical relationship included in an input behavior of the m keywords;
      creating a graph model {G, S} according to the hypothetical condition, wherein G represents a set of the m keywords, and S represents a set of dependence relationships between the m keywords; and
      acquiring keywords with the dependence relationship in the m keywords through the graph model; and
   wherein acquiring keywords with the dependence relationship in the m keywords through the graph model comprises:
      calculating a transition probability according to intensities of the dependence relationships between the m keywords, wherein the transition probability is a probability that each keyword belongs to a keyword with which the dependence relationship exists; and
      performing iteration on the m keywords according to the transition probability to acquire keywords with the dependence relationship in the m keywords.

2. The method as claimed in claim 1, wherein performing iteration on the m keywords according to the transition probability to acquire the keywords with the dependence relationship in the m keywords comprises:
   assuming that an i-th keyword belongs to an i-th keyword cluster before the iteration is performed, wherein the cluster is a set of a class of keywords, i=1, 2 . . . m;
   performing iteration on the i-th keyword for one time according to the transition probability, to calculate a k-th keyword cluster to which the i-th keyword after the iteration belongs, wherein k∈{1, 2 . . . i−1, i+1 . . . m};
   determining whether a difference between the i-th keyword cluster and the k-th keyword cluster is less than a preset value, wherein the preset value is a preset error tolerance value of a keyword cluster set;
   continuing the iteration under a condition that the difference between the i-th cluster and the k-th cluster is greater than the preset value; and
   stopping the iteration under a condition that the difference between the i-th cluster and the k-th cluster is less than or equal to the preset value, to acquire all keywords in the keyword cluster to which the i-th keyword belongs.

3. The method as claimed in claim 1, wherein after classifying keywords with the dependence relationship in the m keywords as keywords of the same type further comprises:
   naming a plurality of keywords of the same type, respectively; and
   sequencing, according to the number of the keywords included in each class of keywords, the plurality of named keywords of the same type.

4. A device for analyzing webpage data, wherein the device comprises:
   a first acquiring component arranged to acquire m keywords inputted by a user on a webpage, wherein m is a natural number greater than one;
   a second acquiring component arranged to acquire keywords in the m keywords with a dependence relationship, wherein the keywords with the dependence relationship are keywords corresponding to one or more same user requirements;
   a classifying component arranged to classify the keywords with the dependence relationship in the m keywords as keywords of a same type;
   a loading module arranged to load a script file code on the webpage;
   a receiving module arranged to receive an input behavior of the user on the webpage; and
   a reading module arranged to read, through the script file code, the m keywords carried by the input behavior on the webpage;
   wherein the second acquiring component comprises:
      a first determining module arranged to determine a hypothetical condition, wherein the hypothetical condition is a hypothetic logical relationship included an input behavior of the m keywords;
      a creating module arranged to create a graph model {G, S} according to the hypothetical condition, wherein G represents a set of the m keywords, and S represents a set of dependence relationships between the m keywords; and
      a first acquiring module arranged to acquire keywords with the dependence relationship in the m keywords through the graph model; and
   wherein the first determining module comprises:
      a calculating module arranged to calculate a transition probability according to intensities of the dependence relationships between the m keywords, wherein the transition probability is a probability that each keyword belongs to a keyword with which the dependence relationship exists; and a second acquiring module arranged to perform iteration on the m keywords according to the transition probability to acquire keywords with the dependence relationship in the m keywords.

5. The device as claimed in claim 4, wherein the input behavior is a behavior of inputting keywords on the webpage.

6. The device as claimed in claim 4, wherein the second acquiring module comprises:
- an assuming sub-module arranged to assume that an i-th keyword belongs to an i-th keyword cluster before the iteration is performed, wherein the cluster is a set of a class of keywords, i=1, 2 . . . m;
- a calculating sub-module arranged to perform iteration on the i-th keyword for one time according to the transition probability, to calculate a k-th keyword cluster to which the i-th keyword after the iteration belongs, wherein k∈{1, 2 . . . i−1, i+1 . . . m};
- a determining sub-module arranged to determine whether the difference between the i-th cluster and the k-th cluster is less than a preset value, wherein the preset value is a preset error tolerance value of a keyword cluster set;
- an iterating sub-module arranged to continue the iteration under a condition that the difference between the i-th cluster and the k-th cluster is greater than the preset value; and
- an acquiring sub-module arranged to stop the iteration under a condition that the difference between the i-th cluster and the k-th cluster is less than or equal to the preset value, to acquire all keywords in the keyword cluster to which the i-th keyword belongs.

7. The device as claimed in claim 4, wherein the device further comprises:
- a naming component arranged to name a plurality of keywords of the same type, respectively; and
- a sequencing component arranged to sequence, according to the number of the keywords included in each class of keywords, the plurality of named keywords of the same type.

* * * * *